US010654167B2

(12) United States Patent
Faure-Vidal et al.

(10) Patent No.: US 10,654,167 B2
(45) Date of Patent: May 19, 2020

(54) METHOD FOR INITIALIZING AND CONTROLLING ROBOTIZED EQUIPMENT

(71) Applicant: DiaMed GmbH, Cressier (CH)

(72) Inventors: Anais Faure-Vidal, Sorbiers (FR);
Sebastien Bernay, Ecoche (FR);
Cedric Gagnepain, Riorges (FR)

(73) Assignee: DiaMed GmbH, Cressier (CH)

( * ) Notice: Subject to any disclaimer, the term of this patent is extended or adjusted under 35 U.S.C. 154(b) by 182 days.

(21) Appl. No.: 15/124,990

(22) PCT Filed: Mar. 10, 2015

(86) PCT No.: PCT/EP2015/054924
§ 371 (c)(1),
(2) Date: Sep. 9, 2016

(87) PCT Pub. No.: WO2015/135919
PCT Pub. Date: Sep. 17, 2015

(65) Prior Publication Data
US 2017/0015001 A1    Jan. 19, 2017

(30) Foreign Application Priority Data
Mar. 10, 2014    (FR) ..................................... 14 51945

(51) Int. Cl.
*B25J 9/16* (2006.01)
(52) U.S. Cl.
CPC ........... *B25J 9/1682* (2013.01); *B25J 9/1692* (2013.01)

(58) Field of Classification Search
CPC ...... B25J 9/1682; B25J 9/1692; B25J 9/0084; B25J 9/02; B25J 9/023; B25J 9/026; B25J 9/06; B25J 9/1697; G01N 35/0099
See application file for complete search history.

(56) References Cited

U.S. PATENT DOCUMENTS

| 2006/0156978 A1* | 7/2006 | Lipson | A61L 27/36 118/708 |
| 2009/0177438 A1* | 7/2009 | Raab | G01B 21/04 702/152 |

(Continued)

FOREIGN PATENT DOCUMENTS

| FR | 2987896 | 9/2013 |
| JP | 2001212782 | 8/2001 |

(Continued)

OTHER PUBLICATIONS

PCT International Search Report for corresponding PCT Application No. PCT/EP2015/054924 dated Jun. 17, 2015, 2 pages.

(Continued)

*Primary Examiner* — Dale Moyer
(74) *Attorney, Agent, or Firm* — Lee & Hayes, P.C.

(57) ABSTRACT

A method of initializing and controlling a robotic installation comprising a first robot (70) having a minimum of four degrees of freedom and a second robot (30) that is of Cartesian type, the method comprising the following steps:
using the first robot (70) to collect location information relating to at least one element situated in a workspace common to the first and second robots; and
using the collected location information to move the second robot (30) in or around the element.

16 Claims, 2 Drawing Sheets

(56) References Cited

U.S. PATENT DOCUMENTS

| | | | |
|---|---|---|---|
| 2010/0275668 A1* | 11/2010 | Riemeier | A61C 7/20 72/293 |
| 2010/0319182 A1* | 12/2010 | Sugimoto | B25J 5/04 29/428 |
| 2011/0022216 A1* | 1/2011 | Andersson | G05B 19/401 700/114 |
| 2013/0089642 A1* | 4/2013 | Lipson | A23P 20/20 426/115 |
| 2014/0148949 A1* | 5/2014 | Graca | G05B 19/41815 700/248 |
| 2015/0111198 A1* | 4/2015 | Brisebat | G01N 35/0099 435/5 |
| 2015/0148952 A1* | 5/2015 | Shiratsuchi | B25J 9/1682 700/248 |
| 2018/0104820 A1* | 4/2018 | Troy | B25J 17/0208 |

FOREIGN PATENT DOCUMENTS

| | | |
|---|---|---|
| JP | 2001237803 | 8/2001 |
| WO | WO2012027541 | 3/2012 |
| WO | WO2013132195 | 9/2013 |

OTHER PUBLICATIONS

JP Office Action from corresponding JP Patent Application No. 2016-555987 dated Jul. 2, 2019, 6 pages.

\* cited by examiner

METHOD FOR INITIALIZING AND CONTROLLING ROBOTIZED EQUIPMENT

TECHNICAL FIELD

The present description relates to a method of initializing and controlling a robotic installation. The term "initialization" is used to mean one or more operations that are performed prior to normal operation of the installation for the purpose of authorizing and/or improving normal operation.

Such a method may be used in particular with a medical analysis installation.

BACKGROUND

Installations for performing medical analyses comprise appliances referred to as "analysis automatons" or "analysis robots" that enable certain operations that would otherwise be performed manually to be performed automatically. The term "medical analysis" is used to mean a process consisting in treating at least one sample taken from a human being or an animal. By way of example, such samples may be samples of body fluids (blood, urine, lymph, saliva, etc.), of cells, or of biological or organ tissues. As examples of medical analyses, mention may be made of blood group tests, tests searching for antibodies, tests for determining compatibility between a donor and a receiver, etc.

Examples of medical analysis installations are described in Documents U.S. Pat. No. 6,162,399, JP 2010/054232, EP 2 145 685, and . . . . All of those installations make use of Cartesian type robots. The term "Cartesian type robot" or "Cartesian robot" is used to designate a robot having only prismatic joints for moving its terminal member (or tool). In other words, in the linkage of the robot, the three degrees of freedom between the base (or stand) of the robot and its terminal member are made possible by at least three prismatic joints.

Cartesian robots, and more particularly those having a terminal member that is not jointed, have the particular feature of making it simpler to model the workspace by taking account only of the positions of objects in that space, independently of their orientations. The simplifying nature of that approach assumes that the orientations of the objects that are to be managed are known in advance, unchanging, and reproducible on each installation. Thus, in order to ensure that the movements of a Cartesian robot relative to the objects it is to manage are accurate, it is necessary for each installation to be set up with great care to ensure that the objects for managing are correctly oriented relative to the Cartesian robot. This requirement makes it significantly more complicated to set up the installation.

There thus exists a need for a solution that enables such drawbacks to be resolved, at least in part.

GENERAL PRESENTATION

The present description relates to a method of initializing and controlling a robotic installation comprising a first robot having a minimum of four degrees of freedom and a second robot that is of Cartesian type. Below, the second robot is referred to equally well as a "second" robot or as a "Cartesian" robot or a second robot of "Cartesian type".

In an embodiment, the method comprises the following steps:

using the first robot to collect location information relating to at least one element situated in a workspace common to the first and second robots; and using the collected location information to move the second robot in or around the element.

The term "location information" is used to designate information about position and orientation. Likewise, the term "situation" is used of an element to designate its position and its orientation. The term "locate" is used to designate the action consisting in collecting location information (i.e. in determining the situation of an element).

Because of its greater freedom of movement compared with the Cartesian robot, the first robot is more "agile" than the Cartesian robot. Use is made of this advantage of the first robot to locate one or more elements (i.e. objects, portions of objects, services, etc.) situated in a workspace that is common to the first and second robots. Reference is made below to the locating step. Thereafter, the collected location information is used for moving the Cartesian robot in this workspace.

There is therefore no need to position these elements relative to the Cartesian robot with great accuracy while setting up the installation, since the situation of each of these elements can be determined accurately after the installation has been seet up, while the first robot is performing the locating step. This leads to a precious saving of time while setting up the installation (where such setting up generally takes place during assembly or maintenance of the installation). Also, when an element is "poorly" positioned relative to its theoretical position while the installation is being set up, the "poor" situation of the element is detected during the locating step and account is taken of this "poor" situation when moving the Cartesian robot. This adjustment makes it possible to reduce any risk of the installation operating poorly.

The location information may be collected by detecting the elements for locating by means of a sensor, in particular a feeler, that is mounted on the first robot. The terminal member of the first robot may be fitted with such a sensor.

The location information may be collected automatically by the first robot. For example, the first robot may be controlled by a program and may perform a certain series of tasks automatically for the purpose of locating said element. The control program may be launched after the installation has been set up. Such control programs are known in the prior art and certain robots are even sold equipped with programs of this type.

The element for locating may be in an inclined zone that slopes relative to the travel planes of the terminal member of the Cartesian robot, i.e. in a zone that forms a non-zero angle relative to the three planes defined by the three pairs of axes of the three prismatic joints of the Cartesian robot. In particular, one of the travel planes of the terminal member of the Cartesian robot may be horizontal, and the zone for locating may slope relative to the horizontal. For example, the angle of inclination of the zone for locating relative to the horizontal may lie in the range 3° to 15°, and more particularly in the range 5° to 10°. It should be observed that such a zone is difficult to locate correctly with a Cartesian robot having a feeler because it is not possible to move the feeler accurately to follow the orientation of the zone. It is therefore advantageous to locate this zone with the first robot, since it is more agile than a Cartesian robot.

The inclined zone may correspond to the peripheral rim of an opening of a container. In the field of medical analysis, the ability to locate this type of zone presents a particular advantage as explained in the detailed description below.

The location information collected by the first robot is generally expressed in a first coordinate system specific to the first robot, and is therefore not directly usable by the second robot. This location information is thus converted into a second coordinate system specific to the second robot prior to being used for moving the second robot. Various conversion methods may be used. For example, a template may be placed in a workspace common to both robots at the time of initialization or while the installation is being maintained, and the template may be located by the first robot so as to determine the coordinates (i.e. the position and the orientation) of the template in a reference frame of the first robot (e.g. the stand reference frame or "world" of the first robot). The situation of the same template can also be located by the second robot so as to determine the coordinates of the template in a reference frame of the second robot (e.g. the stand reference frame or "world" of the second robot). It is then possible to derive a conversion matrix between the two reference frames. The conversion matrix can then be used for using the location information (i.e. the coordinates) of an element in the reference frame of the first robot to calculate the location information of the same element in the reference frame of the second robot.

In addition to the characteristics mentioned above, the proposed method/device may present one or more of the following characteristics, considered individually or in any technically feasible combination:

the first robot possesses six degrees of freedom and at least two rotoid joints; and the terminal member of the second robot is not jointed relative to the remainder of the second robot (i.e. relative to the robot carrier).

The above-described characteristics and advantages, and others, appear on reading the following detailed description of an application of the proposed method. The detailed description refers to the accompanying drawings.

BRIEF DESCRIPTION OF THE DRAWINGS

The accompanying drawings are diagrammatic and they are not to scale, seeking above all to illustrate the principles of the invention.

In the drawings, from one figure to another, elements (or portions of element) that are identical are referenced using the same reference signs.

DETAILED DESCRIPTION OF EXAMPLE(S)

An embodiment is described in detail below with reference to the accompanying figures. This example illustrates the characteristics and the advantages of the invention. It should nevertheless be recalled that the invention is not limited to this example.

Figure 1:
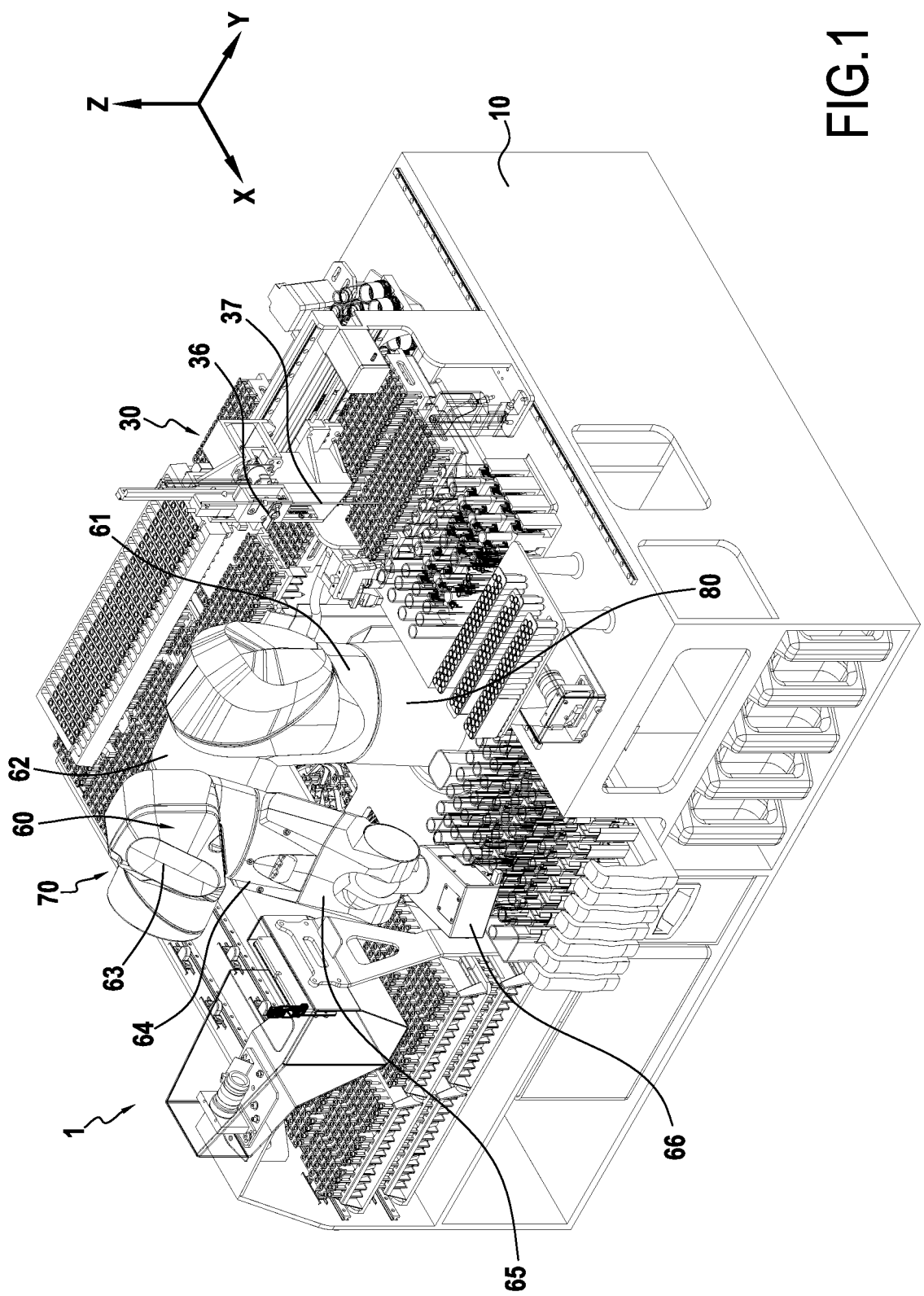
FIG. 1 shows an example of a robotic medical analysis installation.

FIG. 1 shows a robotic installation 1 for performing medical analyses. Installation 1 comprises a frame 10 supporting both a first robot 70 having a minimum of four degrees of freedom and also a second robot 30 of Cartesian type, together with a plurality of containers suitable in particular for receiving samples for analysis and/or for reagents with which the samples react.

The first robot 70 is situated substantially at the center of the installation 1 and it is provided with an arm 60 having multiple joints. In this example, the arm 60 comprises a first arm segment 61 extending from a horizontal stand 80 fastened to the frame 10 and situated substantially at the center of the installation 1. The first arm segment 61 is mounted to pivot relative to the stand 80 about a first axis A1 that is substantially vertical. A second arm segment 62 is connected to the first segment 61 and is pivotally mounted relative thereto about a second axis A2 that is perpendicular to the first axis A1. A third arm segment 63 is connected to the second segment 62 and is pivotally mounted relative thereto about a third axis A3 parallel to A2. A fourth arm segment 64 is connected to the third arm segment 63 and is pivotally mounted relative thereto about a fourth axis A4 that is perpendicular to the third axis A3. A fifth arm segment 65 is connected to the fourth arm segment 64, being pivotally mounted relative thereto about a pivot axis A5 that is perpendicular to the fourth axis A4. Finally, the arm 60 is terminated by a sixth arm segment or terminal member 66 that is connected to the end of the fifth arm 65 remote from the fourth arm 64. The terminal member 66 is pivotally mounted relative to the fifth arm 65 about a sixth axis A6 that is perpendicular to the fifth axis A5. By means of these six rotoid joints having respective axes of rotation A1 to A6, the terminal member 66 can reach all of the elements distributed over 360° around it, at different heights, and with different orientations. It should be observed that the first robot 70 could be provided with equivalent freedom of movement using a different arrangement of joints.

The second robot 30 is a robot of Cartesian type having prismatic joints for moving its terminal member (or tool) 36. These joints enable the terminal member to be moved along three axes X, Y, and Z in a Cartesian (rectangular) reference frame. The XY plane containing the X and Y axes of this reference frame is a plane that is substantially horizontal. The terminal member 36 of this robot is mounted stationary (i.e. it is not jointed) relative to the remainder of the robot (i.e. relative to the carrier of the robot).

Figure 2:
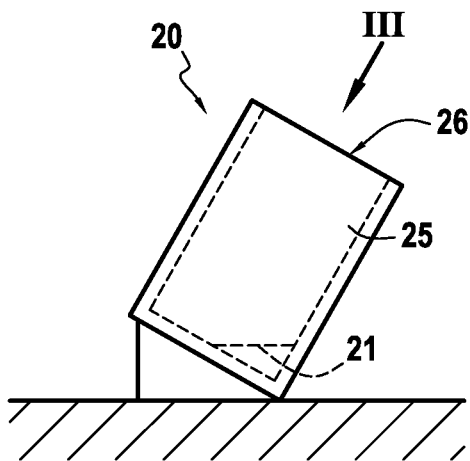
FIG. 2 shows an example of a container used in the FIG. 1 installation.
Figure 3:
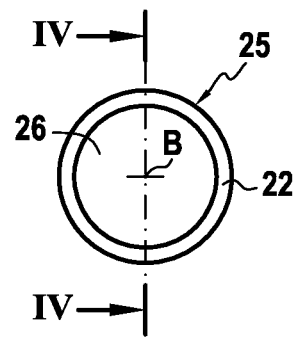
FIG. 3 is a plan view of the FIG. 2 container looking along arrow III.

In this installation, the Cartesian robot 30 is used in particular for taking a certain quantity of reagent 21 from inside a container 20, shown in FIG. 2. To do this, the terminal member 36 of the Cartesian robot 30 is provided with a withdrawal device such as a pipette 37 serving to suck up a determined quantity of reagent 21 at each withdrawal.

In the field of medical analysis, certain reagents are very expensive. Thus, when such a reagent is contained in a container, it is desirable to be able to withdraw all (or nearly all) of the reagent present in the container (i.e. to avoid leaving any unused quantity of reagent in the container), in order to avoid wasting the least quantity of reagent.

Figure 4:
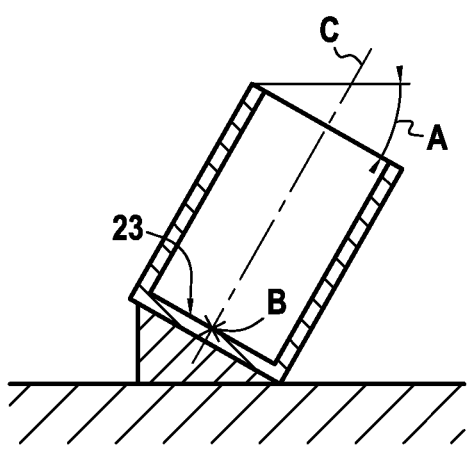
FIG. 4 is an axial half-section on plane IV-IV showing the container of FIGS. 2 and 3.

In the example shown in the figures, the container 20 is in the form of a circular cylinder of axis C. It comprises a cylindrical side wall 25 extending between a bottom wall 23 and an opening 26 remote from the bottom wall 23. The end of the side wall 25 defines the edge 22 of the opening 26. The edge 22 is contained in an inclined plane sloping relative to the horizontal XY plane. This slope is represented by the angle of inclination A in FIG. 4. The center of the bottom wall 23 is referenced B. The axis C passes through the center B.

The container 20 is situated in a workspace common to the first and second robots 70 and 30 of the installation 1.

Figure 6:
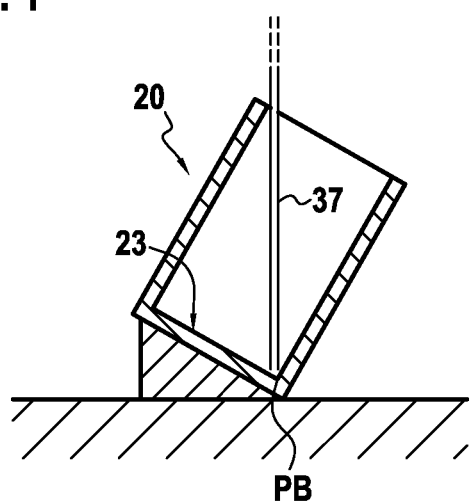
FIG. 6 is a view similar to the view of FIG. 4, showing a step of moving the terminal member of the FIG. 1 Cartesian robot inside the container.

In order to be able to use the pipette 36 to withdraw all (or nearly all) of the reagent 21 present in the container 20 by suction, the container 20 is inclined relative to the horizontal, as shown in the figures. Thus, the lowest point PB of the container is a point situated at the periphery of the bottom wall 23, and the reagent 21 accumulates about this point PB. By bringing the tip of the pipette 37 up to the point PB (see FIG. 6), it is possible to suck up all (or nearly all) of the reagent 21 present in the container 20. It can thus be understood that it is important to be able to bring the tip of the pipette 37 as accurately as possible up to the point PB, since any departure of the tip of the pipette from this point PB leads to a loss of reagent. To do this, it is necessary for the Cartesian robot 30 carrying the pipette to "know" exactly the position of the point PP.

Figure 5:
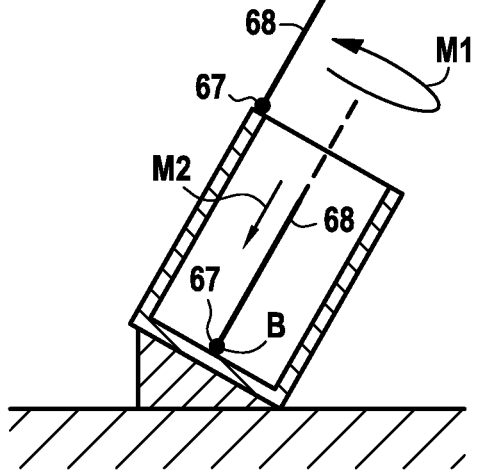
FIG. 5 is a view similar to the view of FIG. 4, showing a step of detecting the bottom of the container.

In order to locate the point PB, a container 20 (generally an empty container) is set up, and the edge 22 of the opening 26 is detected by using a feeler 67 (e.g. a piezoelectric feeler) that is mounted at the end of a rod 68, which in turn is mounted on the terminal member 66 of the first robot 70. This operation does not present any difficulty, given the movement capabilities of the first robot 70. In particular, the terminal member 66 may be inclined in such a manner that the feeler 67 follows the edge 22 while moving in the plane containing the edge 22. This operation is represented diagrammatically in FIG. 5 by arrow M1. The edge 22 is an example of an inclined zone sloping relative to the travel planes of the terminal member 36 of the second robot 30.

Once the edge 22 has been detected and located, it is possible by calculation to deduce the situation of the axis C. The feeler 67 is then taken to the center B of the bottom wall 23 along the axis C. This operation is represented diagrammatically in FIG. 5 by arrow M2. In an alternative, instead of feeling the bottom of the container 20 directly, it is possible to feel the bottom of a housing that is to receive the container 20 and to deduce therefrom by calculation the situation of the center B of the bottom of the container (i.e. by taking account of the thickness of the bottom wall 23). Such operations do not present any difficulty because of the movement capabilities of the first robot 70 (but in contrast such an operation would be impossible to perform using the first robot 30). Knowing the situations of the edge 22 and of the center B of the bottom wall 23, it is possible by calculation to deduce the situation of the lowest point PB.

Once the situation of the lowest point PB is known in a reference frame of the first robot 70 (e.g. its stand reference frame), it is possible by calculation using a conversion matrix to determine the situation of the lowest point PB in a reference frame of the second robot 30 (e.g. its stand reference frame). Using this information, the tip of the pipette 37 can be moved accurately to the point PB and all (or nearly all) of the reagent 21 can be withdrawn.

Naturally, this is merely one example application of the proposed method, and this example is given by way of nonlimiting illustration. In particular, the method may be applied to other types and other shapes of container, and the position of the lowest point of the container may be calculated using other methods relying on locating other zones of the container or on locating certain zones of a support for the container. More generally, in the light of the above description, a person skilled in the art can modify the embodiments or implementations given, or can envisage others, while remaining within the scope of the invention.

Furthermore, the various characteristics of these embodiments or implementations may be used singly or they may be combined with one another. When they are combined, the characteristics may be combined as described above, or otherwise, the invention not being limited to the specific combinations described in the present description. In particular, unless specified to the contrary, a characteristic described with reference to one particular embodiment or implementation may be applied in analogous manner to some other embodiment or implementation.

The invention claimed is:

1. A method of initializing and controlling a robotic installation, the method comprising the following steps:
   using a first robot to collect location information relating to one element situated in a workspace common to the first and second robots, the first robot having a minimum of four degrees of freedom; and
   using the collected location information to move a second robot in or around the element, the second robot being of Cartesian type, which comprises a base and a terminal member joined to the base using only prismatic joints, wherein the collected location information is expressed in a first coordinate system specific to the first robot, this location information being converted into a second coordinate system specific to the second robot prior to being used for moving the second robot.

2. A method according to claim 1, wherein the location information is collected by detecting the element by means of a sensor that is mounted on the first robot.

3. A method according to claim 2, wherein the location information is collected automatically by the first robot.

4. A method according to claim 1, wherein said element is an inclined zone sloping relative to travel planes of the terminal member of the second robot.

5. A method according to claim 1, wherein the first robot possesses six degrees of freedom and at least two rotoid joints.

6. A method according to claim 1, wherein the robotic installation is a medical analysis installation.

7. A method according to claim 4, wherein the inclined zone corresponds to the edge of an opening of a container.

8. A method according to claim 1, wherein the location information is collected automatically by the first robot.

9. A method of initializing and controlling a robotic installation, the method comprising the following steps:
   using a first robot to collect location information relating to one element situated in a workspace common to the first and second robots, the first robot having a minimum of four degrees of freedom; and
   using the collected location information to move a second robot in or around the element, the second robot being of Cartesian type, which comprises a base and a terminal member joined to the base using only prismatic joints, wherein the robotic installation is a medical analysis installation.

10. A method according to claim 9, wherein the location information is collected by detecting the element by means of a sensor that is mounted on the first robot.

11. A method according to claim 10, wherein the location information is collected automatically by the first robot.

12. A method according to claim 9, wherein said element is an inclined zone sloping relative to travel planes of the terminal member of the second robot.

13. A method according to claim 9, wherein the first robot possesses six degrees of freedom and at least two rotoid joints.

14. A method according to claim 9, wherein the collected location information is expressed in a first coordinate system specific to the first robot, this location information being converted into a second coordinate system specific to the second robot prior to being used for moving the second robot.

15. A method according to claim 12, wherein the inclined zone corresponds to the edge of an opening of a container.

16. A method according to claim 9, wherein the location information is collected automatically by the first robot.

* * * * *